US012091056B2

United States Patent
Ramakrishnan et al.

(10) Patent No.: US 12,091,056 B2
(45) Date of Patent: Sep. 17, 2024

(54) OBJECT DETECTION AND TRACKING FOR AUTOMATED OPERATION OF VEHICLES AND MACHINERY

(71) Applicant: Raven Industries, Inc., Sioux Falls, SD (US)

(72) Inventors: Rahul Ramakrishnan, Ames, IA (US); Aziz Alibasic, Waukee, IA (US); Thomas Antony, Ames, IA (US); Venkata Rama Karthik Paga, Ames, IA (US)

(73) Assignee: Raven Industries, Inc., Sioux Falls, SD (US)

( * ) Notice: Subject to any disclaimer, the term of this patent is extended or adjusted under 35 U.S.C. 154(b) by 188 days.

(21) Appl. No.: 17/241,734

(22) Filed: Apr. 27, 2021

(65) Prior Publication Data

US 2021/0331695 A1    Oct. 28, 2021

Related U.S. Application Data

(60) Provisional application No. 63/016,738, filed on Apr. 28, 2020.

(51) Int. Cl.
*B60W 60/00*    (2020.01)
*G06N 3/08*    (2023.01)
(Continued)

(52) U.S. Cl.
CPC .... *B60W 60/00274* (2020.02); *B60W 60/001* (2020.02); *G06N 3/08* (2013.01);
(Continued)

(58) Field of Classification Search
CPC ......... B60W 60/00274; B60W 60/001; B60W 2554/4049; G06V 20/58; G06N 3/08
See application file for complete search history.

(56) References Cited

U.S. PATENT DOCUMENTS 7,400,957 B2    7/2008    Hofer et al.
8,849,494 B1 *    9/2014    Herbach ........... B60W 60/0015
                                                                                    701/24
(Continued)

FOREIGN PATENT DOCUMENTS

AU    2021202038 B2    11/2022
AU    2021262764 B2    11/2023
(Continued)

OTHER PUBLICATIONS

"U.S. Appl. No. 16/740,109, Response filed Jun. 28, 2022 to Non-Final Office Action mailed Mar. 28, 2022", 15 pgs.
(Continued)

*Primary Examiner* — Hussein Elchanti
*Assistant Examiner* — Kenneth M Dunne
(74) *Attorney, Agent, or Firm* — Schwegman Lundberg & Woessner, P.A.

(57) ABSTRACT

A framework for safely operating autonomous machinery, such as vehicles and other heavy equipment, in an in-field or off-road environment, includes detecting, identifying, and tracking objects from on-board sensors configured with the autonomous machinery as it performs activities in either an agricultural setting or a transportation environment. The framework generates commands for navigational control of autonomously-operated vehicles in response to detected objects and predicted tracks thereof for safe operation in the performance of those activities. The framework processes image data and range data in multiple fields of view around the autonomously-operated to discern and track objects in a deep learning to accurately interpret this data for determining and effecting such navigational control.

28 Claims, 3 Drawing Sheets

(51) Int. Cl.
  *G06V 10/764* (2022.01)
  *G06V 10/80* (2022.01)
  *G06V 10/82* (2022.01)
  *G06V 20/58* (2022.01)

(52) U.S. Cl.
  CPC .......... *G06V 10/764* (2022.01); *G06V 10/803* (2022.01); *G06V 10/82* (2022.01); *G06V 20/58* (2022.01); *B60W 2420/403* (2013.01); *B60W 2420/408* (2024.01); *B60W 2554/4049* (2020.02)

(56) References Cited

U.S. PATENT DOCUMENTS

| | | | | |
|---|---|---|---|---|
| 9,183,459 | B1* | 11/2015 | Zhang | G06V 10/811 |
| 9,633,483 | B1* | 4/2017 | Xu | G06F 18/24 |
| 10,152,891 | B2* | 12/2018 | Rusciolelli | A01B 69/008 |
| 10,788,835 | B2 | 9/2020 | Hurd et al. | |
| 11,734,917 | B2 | 8/2023 | Hurd et al. | |
| 11,967,106 | B2* | 4/2024 | Galoogahi | G06T 7/20 |
| 2007/0073473 | A1* | 3/2007 | Altan | G01S 13/862 |
| | | | | 701/518 |
| 2010/0013615 | A1 | 1/2010 | Hebert et al. | |
| 2010/0094481 | A1 | 4/2010 | Anderson | |
| 2010/0094499 | A1 | 4/2010 | Anderson | |
| 2010/0104199 | A1* | 4/2010 | Zhang | G06V 20/588 |
| | | | | 382/199 |
| 2016/0375592 | A1 | 12/2016 | Szatmary et al. | |
| 2017/0242442 | A1* | 8/2017 | Minster | G06T 7/38 |
| 2018/0024549 | A1* | 1/2018 | Hurd | H04W 4/40 |
| | | | | 701/2 |
| 2018/0223502 | A1* | 8/2018 | Kenkel | E02F 9/268 |
| 2018/0261095 | A1* | 9/2018 | Qiu | G08G 1/164 |
| 2018/0321683 | A1 | 11/2018 | Foster et al. | |
| 2019/0049968 | A1 | 2/2019 | Dean et al. | |
| 2019/0086923 | A1 | 3/2019 | Zhang et al. | |
| 2019/0103026 | A1* | 4/2019 | Liu | G06T 7/20 |
| 2019/0146511 | A1 | 5/2019 | Hurd et al. | |
| 2019/0147610 | A1* | 5/2019 | Frossard | G06N 3/045 |
| | | | | 382/103 |
| 2019/0258251 | A1* | 8/2019 | Ditty | G06V 20/588 |
| 2019/0311546 | A1 | 10/2019 | Tay et al. | |
| 2019/0369616 | A1* | 12/2019 | Ostafew | B60W 60/00274 |
| 2020/0218913 | A1* | 7/2020 | Unnikrishnan | G01S 13/867 |
| 2020/0219264 | A1* | 7/2020 | Brunner | G06F 18/2413 |
| 2020/0326715 | A1 | 10/2020 | Hurd et al. | |
| 2021/0027546 | A1* | 1/2021 | Hao | G06T 19/20 |
| 2021/0056713 | A1* | 2/2021 | Rangesh | G06T 7/292 |
| 2021/0108926 | A1* | 4/2021 | Tran | G06N 3/045 |
| 2021/0146952 | A1* | 5/2021 | Vora | G06N 3/08 |
| 2021/0181351 | A1* | 6/2021 | Ge | G05D 1/0248 |
| 2021/0209785 | A1* | 7/2021 | Unnikrishnan | G01S 13/89 |
| 2021/0237761 | A1* | 8/2021 | Das | G06T 7/248 |
| 2022/0398851 | A1* | 12/2022 | Nehmadi | G01S 17/89 |
| 2024/0062535 | A1 | 2/2024 | Hurd et al. | |

FOREIGN PATENT DOCUMENTS

| | | |
|---|---|---|
| AU | 2022268354 B2 | 11/2023 |
| BR | 112022021909 A2 | 4/2023 |
| CA | 3082106 C | 12/2022 |
| CN | 103499973 | 1/2014 |
| CN | 102914967 B | 1/2015 |
| CN | 107817798 | 3/2018 |
| CN | 109521756 | 3/2019 |
| CN | 110780305 | 2/2020 |
| IN | 201921008342 | 3/2019 |
| JP | 2944773 B2 | 9/1999 |
| JP | 2011129126 A | 6/2011 |
| WO | WO-2017103917 A1 | 6/2017 |
| WO | WO-2019094863 A1 | 5/2019 |
| WO | WO-2019136479 A1 | 7/2019 |
| WO | 2020178668 | 9/2020 |
| WO | 2021222279 | 11/2021 |

OTHER PUBLICATIONS

"Australian Application Serial No. 2021202038, Response filed Jul. 19, 2022 to First Examination Report mailed Apr. 11, 2022", 36 pgs.
"Canadian Application Serial No. 3,082,106, Office Action mailed Jun. 25, 2021", 4 pgs.
"International Application Serial No. PCT US2021 029437, International Search Report mailed Aug. 12, 2021", 2 pgs.
"International Application Serial No. PCT US2021 029437, Written Opinion mailed Aug. 12, 2021", 5 pgs.
"U.S. Appl. No. 16/188,114, Advisory Action mailed Aug. 28, 2019", 4 pgs.
"U.S. Appl. No. 16/188,114, Examiner Interview Summary mailed Feb. 12, 2020", 3 pgs.
"U.S. Appl. No. 16/188,114, Final Office Action mailed Jun. 18, 2019", 12 pgs.
"U.S. Appl. No. 16/188,114, Non Final Office Action mailed Jan. 16, 2019", 9 pgs.
"U.S. Appl. No. 16/188,114, Non Final Office Action mailed Feb. 5, 2020", 10 pgs.
"U.S. Appl. No. 16/188,114, Notice of Allowance mailed May 21, 2020", 8 pgs.
"U.S. Appl. No. 16/188,114, Notice of Allowance mailed Oct. 11, 2019", 9 pgs.
"U.S. Appl. No. 16/188,114, PTO Response to Rule 312 Communication mailed Aug. 31, 2020", 1 pg.
"U.S. Appl. No. 16/188,114, Response filed Apr. 3, 2020 to Non Final Office Action mailed Feb. 5, 2020", 14 pgs.
"U.S. Appl. No. 16/188,114, Response filed Apr. 16, 2019 to Non Final Office Action mailed Jan. 16, 2019", 16 pgs.
"U.S. Appl. No. 16/188,114, Response filed Aug. 17, 2019 to Final Office Action mailed Jun. 18, 2019", 13 pgs.
"U.S. Appl. No. 16/740,109, Preliminary Amendment filed Jul. 6, 2020", 8 pgs.
"Australian Application Serial No. 2018365091, First Examination Report mailed Oct. 3, 2020", 4 pgs.
"Australian Application Serial No. 2018365091, Response filed Feb. 4, 2021 to First Examination Report mailed Oct. 3, 2020", 37 pgs.
"International Application Serial No. PCT/US2018/060562, International Search Report mailed Feb. 28, 2019", 3 pgs.
"International Application Serial No. PCT/US2018/060562, Written Opinion mailed Feb. 28, 2019", 5 pgs.
"U.S. Appl. No. 16/740,109, Non Final Office Action mailed Mar. 28, 2022", 17 pgs.
"International Application Serial No. PCT/US2021/029437, International Preliminary Report on Patentability mailed Apr. 4, 2022", 6 pgs.
"Australian Application Serial No. 2021202038, First Examination Report mailed Apr. 11, 2022", 2 pgs.
"U.S. Appl. No. 16/740,109, Final Office Action mailed Sep. 21, 2022", 18 pgs.
"Canadian Application Serial No. 3,082,106, Resonse filed Oct. 19, 2021 to Office Action mailed Jun. 25, 2021", 20 pgs.
"U.S. Appl. No. 16/740,109, Advisory Action mailed Jan. 11, 2023", 4 pgs.
"U.S. Appl. No. 16/740,109, Corrected Notice of Allowability mailed Apr. 13, 2023", 2 pgs.
"U.S. Appl. No. 16/740,109, Notice of Allowance mailed Mar. 27, 2023", 9 pgs.
"U.S. Appl. No. 16/740,109, Response filed Jan. 23, 2023 to Advisory Action mailed Jan. 11, 2023", 20 pgs.
"U.S. Appl. No. 16/740,109, Response filed Dec. 21, 2022 to Final Office Action mailed Sep. 21, 2022", 19 pgs.
"Brazilian Application Serial No. 1120220219091, Voluntary Amendment filed Jan. 11, 2023", w/ English claims, 108 pgs.
"U.S. Appl. No. 16/740,109, Corrected Notice of Allowability mailed Jul. 10, 2023", 2 pgs.
"Australian Application Serial No. 2021262764, First Examination Report mailed Jul. 25, 2023", 2 pgs.
"Australian Application Serial No. 2022268354, First Examination Report mailed Jul. 27, 2023", 3 pgs.
"South African Application Serial No. 2022/12860, Voluntary Amend- (56) References Cited

OTHER PUBLICATIONS ment filed May 4, 2023", w/ English claims, 14 pgs.
"U.S. Appl. No. 18/350,549, Preliminary Amendment Filed Nov. 9, 2023", 7 pgs.
"Australian Application Serial No. 2021262764, Response filed Nov. 6, 2023 to First Examination Report mailed Jul. 25, 2023", 78 pgs.
"Australian Application Serial No. 2022268354, Response filed Oct. 31, 2023 to First Examination Report mailed Jul. 27, 2023", 1 pg.
"European Application Serial No. 21795926.1, Extended European Search Report mailed Sep. 22, 2023", 12 pgs.
Du, Yong Kim, et al., "Data fusion of radar and image measurements for multi-object tracking via Kalman filtering", Information Sciences, vol. 278, (Sep. 1, 2014), 641-652.
Gahlert, Nils, et al., "Beyond Bounding Boxes: Using Bounding Shapes for Real-Time 3D Vehicle Detection from Monocular RGB Images", 2019 IEEE Intelligent Vehicles Symposium (IV), IEEE, 9, (Jun. 2019), 675-682.
Xuesong, Li, et al., "Real-time 3D object proposal generation and classification under limited processing resources", arxiv.org, Cornell University Library, 201 OLIN Library Cornell University Ithaca, NY 14853, (Mar. 24, 2020), 13 pgs.
"Australian Application Serial No. 2023258342, Voluntary Amendment Filed Jan. 3, 2024", 15 pgs.

* cited by examiner

OBJECT DETECTION AND TRACKING FOR AUTOMATED OPERATION OF VEHICLES AND MACHINERY

CLAIMS OF PRIORITY

This patent application claims the benefit of priority U.S. Provisional Patent Application Ser. No. 63/016,738, titled "Fusion and Processing of Data from Multiple Sensors for Long-Range Object Detection and Tracking for Automated Operation of Vehicles and Machinery," filed on Apr. 28, 2020, which is hereby incorporated by reference herein in its entirety.

TECHNICAL FIELD

The present disclosure relates to detection and tracking of objects using sensors from multiple detection systems for autonomous operation of vehicles and machinery. Specifically, the present disclosure relates to a system and method that applies machine learning techniques in a deep learning model to fuse data from multiple sensors to detect and identify objects, and observe and predict tracks of those objects in a field of view of autonomous or driverless vehicles, such as machinery or equipment operated in an off-road and/or in-field setting such as in the performance of agricultural activities, as well as in a transportation setting.

BACKGROUND

Development and deployment of autonomous, driverless or unmanned vehicles and machinery have the potential to revolutionize transportation applications, as well as in industrial applications such as in the agricultural sector. Autonomous vehicle technology is applicable for both automotive and agricultural uses, and in the farming industry it has great potential to increase the amount of land a farmer can work, and also significantly reduce costs. However, there are many nuances to applications of autonomous technology generally, and in particularly in an agricultural setting there are particular issues which make usage of such vehicles and machinery much more difficult than in an automotive setting.

One such nuance is accurately detecting and tracking objects. Currently, autonomous vehicular technology generally applies a camera-based approach to determine a presence of objects, by using camera data with light detection and ranging, commonly known as LiDAR or lidar, to improve object detection and identification. Such technology has only a limited ability to assess distance, velocity and direction, however, and in an agriculture-focused system, safety and efficiency may be reduced by this limitation.

One issue in deploying a camera-based objection detection model as a standalone safety system is its inability to provide information on the distance, velocity and direction of the detected object, and its inability to accurately predict a track of a detected object. Also, in deep learning applications, there is always a chance of false positives. Therefore, there is a need in the art to improve a camera-based safety system in an autonomously-operated vehicle to be more effective in terms of decision-making, and also to avoid intermittent stops for false positives.

Additionally, when autonomously operating vehicles such as agricultural equipment, reliably reacting where such objects have been detected and tracked requires real-time, accurate on-board decision-making, and responsive navigational control to adjust a vehicular state if needed. However, agricultural equipment includes many different types of machines and vehicles, each with their own functions and implements for the various tasks for which they are intended to perform, and these different pieces often operate together in performance of the same, or related, agricultural activities. Each piece of equipment may, for example, have a different profile, size, weight, shape, wheel size, stopping distance, braking system, gears, turning radius, and other relevant characteristics. Each piece of machinery therefore has its own specific navigational nuances that make it difficult to implement a universal or standardized approach to safe autonomous operation that can apply to any piece of agricultural equipment, or to multiple pieces of agricultural operating together.

Accordingly, there is a strong unmet need for a system that meets the substantial requirements of the agricultural sector, and its unique operating environments, as well as for the growing demand of unmanned and driverless vehicles in the transportation sector.

SUMMARY

Embodiments of the present disclosure provide a system and method for combining data from multiple sensor-based detection systems for improvements in accuracy in detecting and tracking objects in a field of view for driverless vehicles, such as autonomously-operated cars and trucks in a transportation environment, and autonomously-operated agricultural machinery, particularly in an in-field or off-road environment.

Embodiments of the present disclosure accomplish this by applying input data collected from a camera to an agriculturally-focused deep learning model, and processes this input data by generating a list of objects identified in a current image frame of a field of view the camera, together with corresponding bounding boxes of those objects. Embodiments of the present disclosure then calculate the orientation of each object in the current image frame with respect to data collected by a ranging system such as radar, and correlates objects detected by the ranging system with the objects seen in the current image frame as seen by the camera using their orientations to fuse (e.g., associate, match, assemble or the like) the corresponding camera detections with detections from the ranging system. Embodiments of the present disclosure also incorporate processing of point-cloud data collected from a further ranging system such as LiDar to develop a further three-dimensional bounding box for identified objects, and outputs a detected object and may include an object type. Embodiments of the present disclosure use artificial intelligence techniques in the deep learning model to fuse data from these different types of sensors to accurately interpret the object-related information therein for tracking detected objects. The deep learning model also applies confidence assessment tools to confirm a validity of detected objects and predicted tracks, and generates output data to enable navigational control of autonomously-operated vehicles in response thereto by adjusting or maintaining characteristics of a vehicular state of one or more of the autonomously-operated vehicles.

It is therefore one objective of embodiments of the present disclosure to provide systems and methods of detecting objects in fields of view of multiple sensors relative to an autonomously-operated vehicle. It is a further objective of embodiments of the present disclosure to provide systems and methods of processing data from multiple sensors in an application of artificial intelligence that fuses information (e.g., associates, matches, assembles or the like) from the multiple sensors to detect objects, and still a further objective of embodiments of the present disclosure to provide systems and methods of processing the fused data to predict tracks for detected objects (e.g., predictive model). It is yet another objective of embodiments of the present disclosure to provide systems and methods that applies one or more tools to develop probabilistic inferences relative to the detected objects and predicted tracks to confirm a validity of objects detected and tracked from the fields of view of the multiple sensors. It is still a further objective of embodiments of the present disclosure to provide systems and methods of determining whether a change in vehicular state is necessary, and to effect navigational control of one or more autonomously-operated vehicles, in response to detected and tracked objects.

It is a further objective of embodiments of the present disclosure to provide systems and methods of ensuring safe autonomous operation of machinery and vehicles in an off-road and/or in-field environment. It is another objective of embodiments of the present disclosure to provide systems and methods of ensuring safe, reliable autonomous operation of machinery while performing agricultural tasks.

Other objects, embodiments, features and advantages of the present disclosure will become apparent from the following description of the embodiments, taken together with the accompanying drawings, which illustrate, by way of example, the principles of the disclosure.

BRIEF DESCRIPTION OF THE SEVERAL VIEWS OF THE DRAWINGS

The accompanying drawings, which are incorporated in and constitute a part of this specification, illustrate several embodiments of the disclosure and together with the description, serve to explain the principles of the present disclosure.

DETAILED DESCRIPTION

In the following description, reference is made to the exemplary embodiments illustrating the principles of the present disclosure and how those embodiments are practiced. Other embodiments will be utilized to practice aspects of the present disclosure and structural and functional changes will be made thereto without departing from the scope of the present disclosure.

Figure 1:
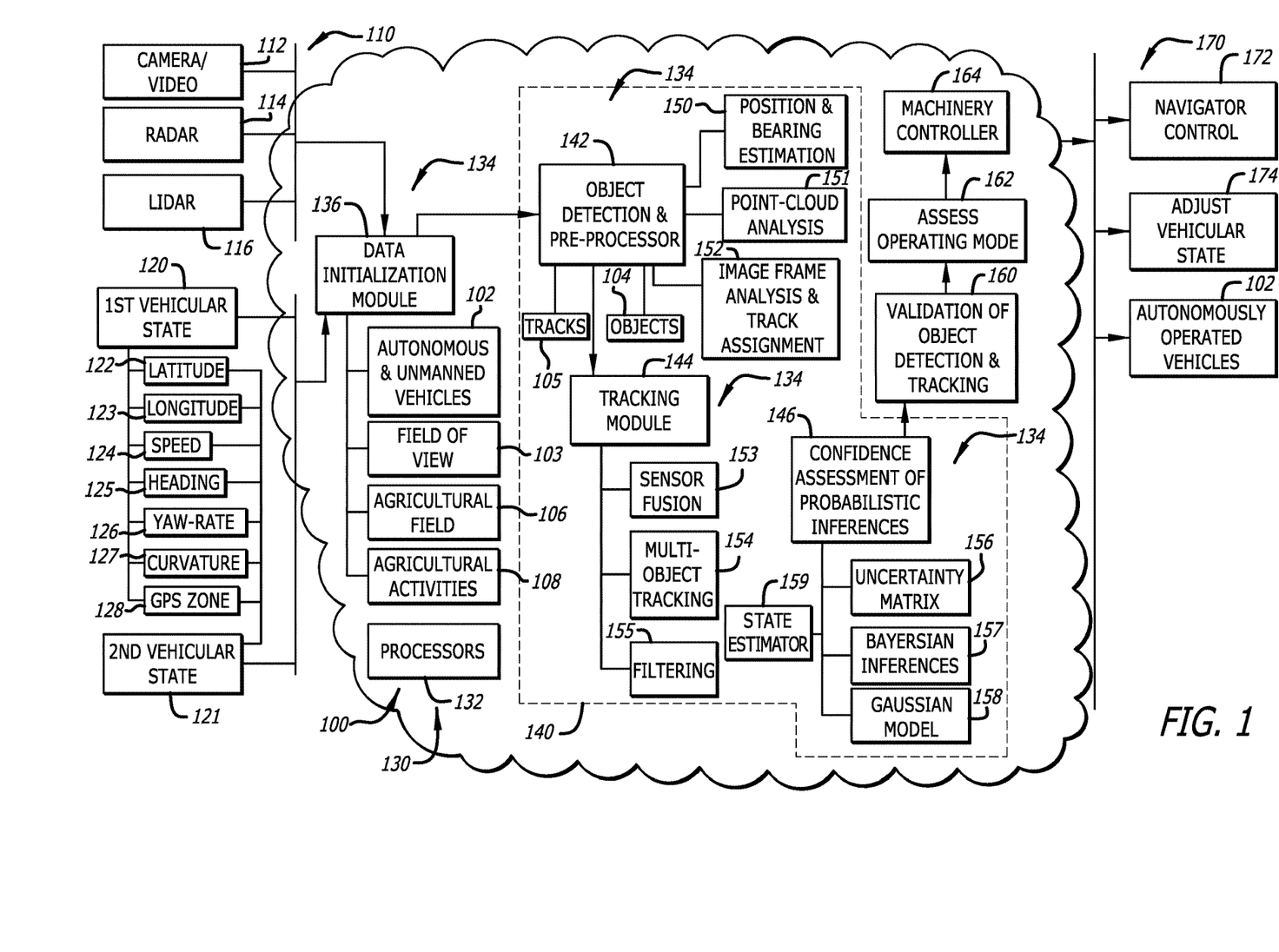
FIG. 1 is a system architecture diagram illustrating functional components in a framework for detecting and tracking objects for autonomous operation of vehicles such as agricultural equipment, according to one embodiment of the present disclosure.

Embodiments of the present disclosure provide an approach for detecting and tracking objects using multiple sensors for autonomous operation of vehicles and machinery, such as driverless vehicles and other heavy equipment, either in a conventional transportation setting, or in an in-field or off-road environment. FIG. 1 is a system architecture diagram for an objection detection and tracking framework 100 for ensuring reliable operation of autonomously-operated vehicles 102, such as driverless agricultural machinery. This objection detection and tracking framework 100 is performed within, and is comprised of, one or more systems and/or methods that includes several components, each of which define distinct activities and functions required to process and analyze input data 110 from multiple types of sensors within a deep learning model 140, to detect, identify, and track objects 104 the presence and behavior of which may affect an operational state of autonomously-operated vehicles 102 as they are used to conduct operations such as agricultural activities 108, or as they are used in a transportation environment. The framework 100 generates output data 170 that is used, in one embodiment, to provide navigational control 150 for autonomously-operated vehicles 102, such as in one or more instructions, signals or commands for remote operation of such autonomously-operated vehicles 102, or to adjust or maintain a vehicular state thereof.

It is to be understood that when applicable in an agricultural setting, the object detection and tracking framework 100 may be utilized with any type of vehicle, machine, or equipment, such as for example tractors, plows, combines, harvesters, tillers, grain carts, irrigation systems, and other such agricultural implements, and for any type of agricultural activity 108 for which autonomous operation of such vehicles, machinery, and equipment may be involved. Additionally, and as noted above, the object detection and tracking framework 100 may be utilized with any type of vehicle used in a transportation setting, such as for example the autonomous or unmanned operation of passenger or commercial vehicles. Therefore, the present disclosure is not to be limited to any type of vehicle, machine or equipment, nor or type of activity or application environment specifically referenced herein. Similarly, the object detection and tracking framework 100 may be utilized with any type of vehicle, machine, or equipment, either on or off of a road, and regardless of the industrial or commercial application thereof. It is to be further understood that embodiments of the present disclosure may be applicable to either a single autonomously-operated vehicle 102 or multiple such vehicles 102 operating in conjunction with each other in the performance of activities in either an agricultural or transportation setting.

The object detection and tracking framework 100 performs these functions by ingesting, retrieving, requesting, receiving, acquiring or otherwise obtaining input data 110 from multiple detection systems, comprising a plurality of sensors that have been configured and initialized to observe one or more fields of view 103 around autonomously-operated vehicles 102, for example as they operate in an agricultural field 106 and/or while performing an agricultural activity 108. As noted further herein, many types of sensors may be utilized in these detection systems, these sensors may be deployed on, or proximate to, the autonomously-operated vehicles 102. Additionally, it is to be understood that input data 110 may be collected from either these on-board/proximate detection systems, and/or from one or more external third-party sources.

The input data 110, as noted above, includes information obtained from one or more detection systems configured either on-board, or, proximate to, an autonomously-operated vehicle 102, and these detection systems comprise one or more sensors that collect different types of data. The input data 110 includes images collected from a camera or cameras 112, such as a RGB (3-color) camera or a thermographic camera or both, and may further include a camera 112 configured for a forward-facing field of view 103, and a camera 112 or system of cameras 112 configured for a 360° degree field of view 103 around the autonomously-operated vehicle 102. The input data 110 also includes images collected from a thermographic camera, and a video camera. Regardless, input data 110 obtained from cameras 112 may be in either raw or processed form, and therefore the detection systems may include algorithms and hardware configured to process image frames from a camera 112 for the object detection and tracking framework 100.

The input data 110 also includes information obtained from reflected signals from radio or other waves obtained from one or more ranging detection systems. Many different types of ranging systems are contemplated, and may include ground penetrating radar systems 114, and LiDAR systems 116. Still other types of ranging systems are contemplated, including sonar, ultrasonic, time of flight, and any other ranging systems capable of analyzing a field of view 103 around autonomously-operated vehicles 102. Each of these ranging systems emits waves in a defined field of view 103 relative to the autonomously-operated vehicle 102, and signals reflected back are utilized to identify spatial attributes of any object in the field of view 103. As with input data 110 obtained from cameras 112, information from ranging systems such as radar 114 and LiDar 116 may be in either raw or processed form, such that detection systems may include algorithms and hardware capable of processing such input data 110 for follow-on usage.

Input data 110 also includes vehicular state data for one or more autonomously-operated vehicles 102. As noted above, it is often the case that multiple autonomously-operated vehicles 102 are deployed together in the performance of agricultural activities 108, for example where a tractor pulls a grain cart in tandem with a combine. The object detection and tracking framework 100 of the present disclosure therefore contemplates that input data 110 may include first vehicular state data 120 and second vehicular state data 121, each of which comprise multiple operational characteristics of an autonomously-operated vehicle 102. It is to be understood however, and as noted above, that any number of autonomously-operated vehicles 102 may be deployed at least in the performance of agricultural activities 108 (and for transportation-related activities, for example where an unmanned service vehicle is deployed to assist a stranded passenger or commercial vehicle), and therefore the vehicular state data may include operational characteristics for n autonomously-operated vehicles 102, and embodiments of the present disclosure are not to be limited to any specific number of such autonomously-operated vehicles 102, either for the vehicular state data or for any other aspect of the present disclosure.

There are many possible operational characteristics which may comprise each of the first vehicular state data 120 and the second vehicular state data 121 for autonomously-operated vehicles 102. These operational characteristics may include a latitude 122 and a longitude 123, representing positional coordinates of the respective autonomously-operated vehicle 102. The operational characteristics may also include a GPS zone 128. Because the accuracy of a global positioning system varies depending on the curved surface regions of earth, one must often convert latitude and longitude into the Universal Transverse Mercator (UTM) system for assigning coordinates to locations on the surface of the Earth for a more precise understanding of a vehicle's positioning, particularly where uneven terrain characteristics are prevalent such as in the performance of agricultural activities 108. To compensate for such a curvature, evenly-spaced vertical slices from the North Pole to the South Pole are taken, and these slices are then numbered as zones, and this zone information is used to convert latitude and longitude into UTM coordinates.

The first vehicular state data 120 and the second vehicular state data 121 may also include operational characteristics associated with vehicular movement, such as speed 124, heading 125, yaw-rate 126, and curvature 127. The curvature 127 represents a turning radius for wheels affixed to the respective autonomously-operated vehicle 102, and provides an understanding of how much time is needed to turn such a vehicle 102 in a particular direction or to a particular angle.

Many other types of input data 110 are also possible for use within the object detection and tracking framework 100 of the present disclosure. For example, input data 110 may also include other specific GPS data that enables GPS receivers to determine positional coordinates and/or boundaries of obstacles and terrain, as well as boundaries of the field 106 itself within which the autonomously-operated vehicles 102 are being operated. This allows the framework 100 to apply one or more georeferencing tags to mark known obstacles or terrain for the deep learning model 140, described further herein, in the comparison for example of bounding boxes and pixel characteristics of detected objects to known items in determining what is within the field of view 103 for the detection systems and plurality of sensors providing input data 110.

Input data 110 may also include images captured by satellite systems, which may also be used to correlate known items such as obstacles and terrain characteristics with those that are detected and tracked in the framework 100 of the present disclosure. For example, if a body of water is captured in satellite image data in a particular field 106 in which the autonomously-operated vehicles 102 are operating, information about this terrain characteristic may be applied to detect, identify, and classify such a terrain characteristic, as well as to distinguish it from other detected objects 104.

Regardless of the type or source, the input data 110 is applied to a plurality of data processing modules 134 that are components within a computing environment 130 that also includes one or more processors 132 and a plurality of software and hardware components. The one or more processors 132 and plurality of software and hardware components are configured to execute program instructions or routines to perform the components, modules, and functions of the object detection and tracking framework 100 described herein, and embodied by the plurality of data processing modules 134.

The plurality of data processing modules 134 in computing environment 130 include a data ingest and initialization module 136, which is a component that may be configured to initiate collection of input data 110 from the detection system and plurality of sensors therein, and perform the ingest, retrieval, request, reception, acquisition or obtaining of input data 110. The data ingest and initialization module 136 may also be utilized to configure fields of view 103 of each sensor collecting input data 110, as fields of view 103 may be definable based on characteristics such as weather conditions being experienced or expected where autonomously-operated vehicles 102 are operating, the type and configuration of equipment and machinery being operated, the specific activity 108 being performed, knowledge of particular obstacles or terrain therein, and any other localized or specific operating conditions that may impact each field of view 103 and the operation of the autonomously-operated vehicles 102.

The plurality of data processing modules 134 together comprise at least a portion of the deep learning model 140, which represents an application or one or more machine learning and artificial intelligence techniques that are used to detect objects 104, assign, confirm, predict and follow tracks 105 thereof, integrate one or more mathematical models in a confidence assessment of the detected objects 104 and tracks 105, and generate output data 170 that represents predictions based on the objects 104 and tracks 105, as well as to make decisions regarding navigational control 172 and adjustment of a vehicular state 174 for autonomously-operated vehicles 102 in response to the detected objects 104 and tracks 105 thereof.

The deep learning model 140 includes an object detection pre-processing module 142, comprised of one or more pre-processors and components that analyze particular types of input data 110 to detect objects 104 and prepare the input data 110 for subsequent processing in a tracking module 144 and confidence assessment module 146. The object detection pre-processing module 142 includes a radar data pre-processor which is a component configured to perform position and bearing estimation 150 on sensor data collected by the radar-based ranging system 114, a LiDar pre-processor which is a component configured to perform a point-cloud analysis 151 on sensor data collected by the LiDar-based ranging system 116, and a camera data pre-processor which is a component configured to perform image frame analysis and track assignment 152 on sensor data in images collected by the camera 112.

The deep learning model 140 performs position and bearing estimation 150 within the object detection pre-processing module 142 by analyzing input data 110 collected by the radar-based ranging system 114. The output of the radar 114 is an instantaneous list of an angular orientation, a distance, and a velocity of each object 104 relative to a center of the field of view 103 from reflected signals in radar data. It is to be noted that the output from the radar 114 may include false positives, which need to be filtered for effective use of radar measurements. This filtering is performed using several parameters, such as consecutive hits (total number of times the radar has seen the same object), probability of existence, reflective power (in dB) from that object 104 and standard deviation of angle, all of which are provided as part of the output from radar 114.

The deep learning model 140 performs frame analysis and assignment tracking 152 to detect objects 104 in an output of the camera 112, which is an instantaneous raw RGB image. Object detection on these raw RGB images is achieved by identifying an object's bounding box and 2D locations in each image frame. This is used to compute the angle and distance of the objects 104 with respect to a position of the camera 112 by analyzing a center of its corresponding image frame (e.g., reference frame), and intrinsic parameters such as a focal length of the camera 112. The position and bearing information 150 is then used to correlate each object 104 in the image frame taken by the camera 112 with each object 104 in the field of view 103 of the radar 114, to identify each object 104 that has a matching orientation between the camera 112 and the radar 114.

The deep learning model 140 also performs a point-cloud analysis 151 within the object detection pre-processing module 142 by analyzing the output of the LiDar-based ranging system 116. The output of the LiDar-based ranging system 116 is an instantaneous raw point-cloud comprising the 3D location of each point in the cloud. The raw-point cloud is processed in multiple stages as follows. In a first, filtering stage, the points in the raw cloud that do not fit specified criteria (which may be defined by a user) are considered outliers and removed from the cloud. This filtering stage is configured to remove points that are outside of operating conditions of the particular field application for which data 110 is collected. For example, where the application is autonomous tractor operations, the need to work with points that are more than 100 meters away from a vehicle is minimal. Therefore, one would specify as criteria to remove points in the cloud that are more than 100 m away, which may be accomplished as noted by a support tool.

After filtering, point-cloud data is processed in a ground plane extraction stage, in which the points that represent the ground are identified and removed from the raw cloud. Depending upon the application, the necessity to identify ground versus objects 104 in the surrounding environment varies. Since a point cloud can comprise over a million points, minimizing the number of points based on the application requirements is essential to minimize the processing and computation time. Therefore in this stage, the points that represent the ground are separated from the points that represent objects 104 in the environment. The fact that the surface normal between the ground and the objects 104 are offset is used to separate ground points from the rest of the objects 104.

In a further clustering and segmentation stage, the cluster of points in the point-cloud corresponding to each object 104 in the environment is segmented into individual point clouds. This is done using methods of model-based segmentation. For example, a SAmple Consensus model (SAC) is used to create a model for detecting planes. Embodiments of the present disclosure may also use a Random SAC (RANSAC) model to compute the best model that fits the given point-cloud and based on the model used to cluster and segment the point cloud into individual point clouds that each represent an object 104 of interest. From this, the maximum and minimum values can be extracted across each dimension (x, y, z) to produce a 3D bounding box for each of the segmented objects 104.

As noted above, the deep learning model 140 of the framework 100 also includes an object tracking module 144, which is a component configured to fuse sensor data, and to develop and filter object tracks 105. The object detection and tracking framework 100 passes the pre-processed data from the camera 112, radar 114 and LiDar 116 in the object detection and pre-processing module 142 to this object tracking module 144 to perform these functions.

The object tracking module 144 initially is configured to perform sensor fusion 153. This fusion 154 of sensor data may be performed by calculating an orientation of each object 104 in the current camera frame with respect to radar 114, and correlating objects 104 using those orientations to match objects 104 and thereby fusing detections across both fields of view 103 of the camera 112 and the radar 114. These fused detections are used to create and assign tracks 105 for objects 104 to monitor an object's movement across a field of view 103. It is to be noted that at the start of the tracking process, detections from only the camera 112 are used to create/spawn new tracks 105. The values of the created tracks 105 are then updated by measurements from any of the sensors in the order they arrive into the subsystem of the present disclosure for object tracking in module 144. It is also to be noted that a track 105 may be initially inferred from data from radar 114, as the distance, angle and velocity of objects 104 indicate (as radar inherently does primitive tracking) in the operating environment.

In the process of assigning a measurement from any given sensor to an existing track 105 performed in this module 144, since the information in tracks 105 consists of information from other sensors, this can also be regarded "fusing" the current sensor measurement with existing sensor data. Regardless, the measurements from all of the sensors are stored in the same queue from which each measurement is processed in the order they come into the queue. The measurement may be from any of the three sensors—camera 112, radar 114, and LiDar 116—and any other sensors utilized in the framework 100. The assignment metric that correlates measurements to tracks 105 varies, depending on the sensor that the measurement came from.

If the measurement is from the camera 112, the assignment metric is an Intersection over Union (IoU) mathematical model, which allows for an evaluation of how similar the measurement's bounding box is to the track's bounding box. This is performed to compare the ratio of the area where the two bounding boxes overlap to the total combined area of the two bounding boxes. For such camera-provided measurements, an embodiment of the present disclosure loops through each object 104 in the measurement and calculates the IoU over existing tracks 105, and assigns them to corresponding tracks 105 if their IoU is for example greater than 0.5.

If the measurement is from LiDar 116, the assignment metric is again the Intersection over Union (IoU) mathematical model. The 3D bounding boxes of objects 104 derived from the point-cloud analysis of LiDar data 116 are converted so as to be geometrically projected as 2D bounding boxes in the image frame. By performing this conversion, assignment is achieved using the same process as mentioned above for measurements from the camera 112.

If the measurement is from radar 114, the assignment metric is a value function which uses the angle and distance of the object 104 to correlate it to the track 105. The value function is a combined ratio of the measurement's distance and angle to the track's distance and angle. For a given set of existing tracks 105 and radar measurements, embodiments of the present disclosure solve for this value function to achieve linear assignment between tracks 105 and measurements. In one embodiment, where a measurement exactly corresponds to a track, the ratio is equal to 2.

At the conclusion of assigning a measurement from any given sensor to an existing track 105 performed in the sensor fusion 153 and multi-object tracking 154 aspects of the deep learning model 140, the object tracking module 144 generates three possible outputs—matched detections, unmatched detections, and unmatched tracks. Matched detections are detections/measurements that match an existing track 105 during assignment. These are the detections that are used by the object tracking module 144 to update existing tracks 105 with the latest values. Unmatched detections are detections/measurements that did not match with any of the tracks 105 during assignment. If these detections are from camera 112, they are used to spawn new tracks 105 into the object tracking module 144. Unmatched tracks 105 are tracks 105 that do not have any matched detections/measurements during assignment. These tracks 105 are still tracked for a limited period of time before they are deleted from the list of tracks 105, unless they get a matched measurement within that period of time.

These assignment outputs are then analyzed by object tracking module 144 to perform multi-object tracking 154 and filtering 155. The three outputs from the assignment performed as part of sensor fusion 153 are used to either update existing tracks 105, create new tracks 105 or delete existing tracks 105. The object tracking module 144 then applies a state estimator (e.g., Kalman filter) with a linear model for prediction and tracking. The states of the state estimator are row (pixels), col (pixels), area (pixels), aspect ratio, rate of change of row, rate of change of column, distance, bearing and rate of change of radial distance. These states are predicted and updated for each time step based on the values of incoming measurements.

Matched detections as noted above are used to update tracks 105. Depending on the sensor the detection comes from, only certain values updated; the values that a sensor measurement can update is based on how accurate the value is, given the sensor providing the measurement. For example, radar 114 is uncertain about the label of the object 104, but camera 112 provides greater certainty. Similarly, the camera 112 does not enable a good estimate of the velocity of the object 104, but radar 114 does. Hence each sensor only updates a particular set of values in the track 105, as follows.

If the matched detection is from camera 112 then the following important track parameters are updated: class label, bounding box, angle, distance and score. If the matched detection is from radar 114 then the following important track parameters are updated: velocity, angle, and distance. If the matched detection is from LiDar 116 then the following important track parameters are updated: bounding box, angle, and distance.

This step of predicting and updating states of the state estimator (e.g., Kalman filter) in multi-object tracking 154 happens every time a new measurement is ingested from a sensor and pre-processed by the object detection module 142. Unmatched tracks 105 are filtered out using certain conditions in the next step as explained further below. Also, unmatched object detections from the camera 112 help to create new tracks 105 based on certain filtering conditions also as explained below.

Unmatched tracks 105 are either objects 104 that the sensor-based detection systems were previously detecting, but no longer exist in their field of view 103, or objects 104 that exist but the sensors failed to detect briefly. To account for both cases, the object tracking module 144 filters out their tracks 105 by removing them from a list of tracks 105 after a decay period, which is based on the last time a measurement corresponding to that track 105 was received. During this decay period. just the state estimator-based prediction step is executed, but not the update step. If the object tracking module 144 receives a measurement that matches the track during this decay period, the update step is performed and the track 105 is moved from the list of unmatched tracks 105 to the list of matched detections.

Unmatched detections are either objects 104 that just entered the field of view 103 of the sensors, or are false positives. Since radar 114 and LiDar 116 are prone to pick up irrelevant detections in the environment, to avoid or reduce the rate of false positives only the camera 112 is used to spawn a new track 105. Even in case of an unmatched camera detection, the object tracking module 144 creates a new track 105 but does not make it visible to the user or viewer of the output in an embodiment of the present disclosure. It keeps a log of the number of times the camera 112 has seen the same object 104, and only if it is greater than a threshold value (not a false positive) will it make the corresponding track 105 visible. Once visible, it can be updated by another sensor measurement as described above.

The deep learning model 140 of the framework 100 also includes a confidence assessment module 146, which is a component configured to apply one or more mathematical models or processes to calculate probabilistic inferences to confirm detected objects 104 and tracks 105. The confidence assessment module 146 performs these calculations by developing an uncertainty matrix 156 of errors from sensor measurements due to noise, filtering the errors due to noise in a state estimator (e.g., Kalman filter) 159, applying a Bayesian inference model 157 to convert the uncertainty matrix into a total probability value, and assessing specific attributes of the detected and tracked object by fitting a Gaussian model 158 to identify a specific bounding box of the detected and tracked object 104 across multiple sensor measurements, and comparing the attributes of the detected and tracked object 104 across multiple sensor measurements with the total probability value.

The internal representation of each track 105 is supplemented with an uncertainty matrix 156 representing an estimate of its current state value. The uncertainty matrix 156 represents a belief about the validity of given a track 105, based on its current state values and their internal dependencies (explicitly modelled and/or inferred). Uncertainty is akin to noise in the measurement or deviation from the prediction. For every track update, the current uncertainty value is used to perform a weighted average. Mathematically, uncertainty captures the auto-covariance and co-variance of the state representation.

The underlying value of this uncertainty matrix 156 is shown by the ability to continuously predict the motion and track objects 104 that are not necessarily perceived by all the sensors at any given instance (for the life time of the object 104 within the field of view 103 of the tractor or other autonomously-operated vehicle 102) and without any perceivable restrictions that could be attributed to the object 104, such as linear versus non-linear motion, static versus dynamic, grounded or aerial, etc.

Given a state value property and its associated uncertainty, the lower the uncertainty, the stronger the likelihood or belief that the attribute and its associated value represent the ground truth at that given instance. Further, the probability that a track 105 exists is mathematically modelled by the total probability given the current state value of track 105 and its associated uncertainty.

In addition to the probability of the existence of the track 105, the confidence assessment module 146 performs a Bayesian representation 157 to infer the probability of the object's current distance, given all the remaining state values and their estimation uncertainties representing noise in the measurements. Finally, in order to model the uncertainty in the artificial intelligence-based inference on data from the camera 112 and LiDar 116, an embodiment of the present disclosure fits a Gaussian model 158 to capture the likelihood of these perceived sensor measurements.

The development of an uncertainty matrix 156 in the framework 100 may further include application of a state estimator 159 as noted above to determine such noise or errors from measurements taken over time that contain statistical noise and other inaccuracies. The uncertainty matrix 156 therefore produces estimates of unknown variables that tend to be more accurate than those based on a single measurement alone, by estimating a joint probability distribution over the variables for each period of time. The uncertainty matrix 156 utilizes and captures errors in the state value prediction of sensor measurement noise, and both epistemic uncertainty (confusion and ignorance in the data across objects) and aleatoric uncertainty (deviation from the expected behavior, given all the perceivable data about a specific object) in its artificial intelligence-based probabilistic inferences by applying a state estimator 159. Thus, the confidence assessment module 146 uses the estimates of the uncertainty matrix 156 and Bayesian inferences 157 to generate a validation 160 of the results to establish the state of objects 104 in the perceived environment and their relation to the behavior of autonomously-operated vehicles 102.

Once a validation 160 of detected object 104 and an associated track 105 has been confirmed by the confidence assessment module 146 of the deep learning model 140, the framework 100 then performs an assessment of the operational mode 162 of the autonomously-operated vehicle 102. This assessment may include determining whether to maintain or adjust an operational mode, such as a first vehicular state 121 or a second vehicular state 122, in response to a detected/tracked object 104. An output relative to maintaining or adjusting the operational mode of an autonomously-operated vehicle 102 is sent to a machinery controller 164, and from there output data 170 is generated to effect navigational control 172 of the autonomously-operated vehicle 102.

Output data 170 may also include an instruction to adjust 174 a first or second vehicular state 121 or 122, or both. The instruction to adjust 174 may include an instruction to adjust one or more characteristics of the first and second vehicular states 121 and 122, such as effecting a directional change autonomously-operated vehicle 102 by providing new positional coordinates such as latitude 122 longitude 123, providing a new heading 125, and adjusting operational characteristics associated with vehicular movement such as increasing or decreasing speed 124, braking, stopping, gear selection and changing gears, steering control, and other manipulations that take into account other motion characteristics such as yaw-rate 126 and curvature/turning radius 127. Regardless, this instruction to adjust 174 may comprise a plurality of instructions, and may be communicated directly to an on-board controller coupled to the autonomously-operated vehicle 102 or may be effected remotely and directly from the machinery controller 164 itself. Additionally, the framework 100 may generate, as one component of output data 170, a drivable pathway in response to the detected object 104 and its associated track 105, and implement this drivable pathway in one or more instructions to adjust 174 or again from the machinery controller 164 itself. It is to be understood that many other commands for navigational control 172 derived from the output data 170 are also possible and within the scope of the present disclosure, and therefore this disclosure is not to be limited to any instruction or command specifically delineated or described herein.

It should be noted that the processing of input data 110 in the deep learning model 140 (and within the framework 100 generally), as well as the exercise of navigational control 172 and adjustment 174 of vehicular state that is responsive to detected and tracked objects 104, occurs in real-time. It is therefore to be understood that there is no (or negligible) latency in the performance of the object detection and tracking framework 100 and the various data processing components, modules, and functions described herein.

As noted above, the object detection and tracking framework 100 of the present disclosure uses a plurality of sensors so that an object 104 may be detected using more than one source, both to improve accuracy and to account for operating conditions where reliability of sources may be impaired. As one skilled in the art will readily appreciate, environmental factors may affect the ability of the framework 100 to detect, identify and track an object 104, as images and reflected radio or other signals in the fields of view 103 may not be sufficient for the deep learning model 140 to properly perform. For example, when a level of light is relatively low, an RGB camera 112 may not generate enough data to allow the deep learning model 140 to detect and identify an object 104 photographed by that sensor, or create and develop tracks 105. Similarly, in settings where the environment and the objects within it have substantially the same temperature, a deep learning model 140 utilizing data from another type of camera, such as a thermographic camera, may not be able to properly detect or identify an object 104 or create and develop tracks 105. However, the combination of different types of cameras 112 can greatly improve the ability for the framework 100 to accurately detect, identify and track an object 104 in combination with other sensors such as radar 114 and LiDar 116.

It is to be further understood that the plurality of sensors in the detection systems that capture input data 110 may be both configured on-board autonomously-operated vehicles 102, so as to collect input data 110 as the autonomously-operated vehicles 102 operates, or otherwise associated with such autonomously-operated vehicles 102 so that sensors need not be physically coupled thereto. For example, where the framework 100 of an embodiment of the present disclosure includes satellite imagery in its processing, such imagery may be ingested, received, acquired, or otherwise obtained from third party of external sources. Additionally, it is also contemplated and within the scope of the present disclosure that the framework 100 may utilize input data 110 collected by other vehicles, driverless or otherwise, operating in the same field 106 as the autonomously-operated vehicles 102, either at the same time or at other relevant temporal instances.

The framework 100 includes one or more layers of artificial intelligence that are applied to assist the deep learning model 140 and the performance of data processing functions in the object detection and pre-processing module 142, the object tracking module 144, and the confidence assessment module 146. As noted above, these layers of artificial intelligence and other types of machine learning are used in the framework 100 to associate and compare information in the various types of input data 110 and identify attributes in such input data 110 to produce detections of objects 104 and to create and predict tracks 105 representing movement of those detected objects 104. As part of the processing performed in the framework 100 and the deep learning model 140, this application of one or more layers of artificial intelligence may include one or more neural networks configured to develop relationships among and between the various types of input data 110 to perform the correlations and matching used to recognize objects 104 across images and reflected from different types of sensors having different fields of view 103, which are used to determine whether the framework 100 needs to take action to manipulate and control the autonomously-operated vehicles 102 in response to the detected presence of an object 104 and its track 105.

Embodiments of the present disclosure contemplate that temporal and spatial attributes in the various types of input data 110 may be identified and developed in such a fusion of sensor data by training the one or more layers of artificial intelligence in the deep learning model 140 to continually analyze input data 110, to build a comprehensive dataset that can be used to make far-reaching improvements to how objects 104 and tracks 105 are determined as autonomously-operated vehicles 102 operate in a field 106 and/or in the performance of agricultural activities 108, or in a transportation setting, either alone or in combination with other such vehicles 102. For instance, the one or more layers of artificial intelligence can be applied to an adequately-sized dataset to draw automatic associations and identify attributes in pixels, effectively yielding a customized model that can detect commonly-encountered objects 104 in a particular field 106 and predict tracks 105 thereof. As more and more data are accumulated, the information can be sub-sampled, instantiations of artificial intelligence and machine learning such as neural network(s) retrained, and the results tested against independent data representing known objects 104, in an effort to further improve the detection and tracking functions of the framework 100. Further, this information may be used to identify which factors are particularly important or unimportant in associating temporal and spatial attributes and other characteristics when detecting and identifying objects 104 and tracking their movements, thus helping to improve the accuracy and speed of the framework 100 over time.

Embodiments of the present disclosure contemplate that many different types of artificial intelligence may be employed within the scope thereof, and therefore, the deep learning model 140 and sub-systems comprised thereof may include one or more of such types of artificial intelligence. The deep learning model 140 may include, in addition to those mathematical functions and processes described above, techniques such as k-nearest neighbor (KNN), logistic regression, support vector machines or networks (SVM), and one or more neural networks as noted above, such as a convolutional neural network (CNN), a fully convolutional neural network (FCN), or a Recurrent Neural Network (RNN). Regardless, the use of artificial intelligence in the framework 100 of an embodiment of the present disclosure enhances the utility of the detection and tracking functions by automatically and heuristically identifying pixel attributes such as shapes, brightness and groupings, using mathematical relationships or other means for constructing relationships between data points in information obtained from camera 112, radar 114, and LiDar 116, and other sensors where applicable, to accurately detect, identify, and track objects 104. For example, where pixel characteristics known to be related to a particular object 104 are known and analyzed with the actual objects 104 in real-world situations, artificial intelligence techniques are used to 'train' or construct models that relate the more readily-available pixel characteristics to the ultimate outcomes, without any specific a priori knowledge as to the form of those attributes.

Figure 2:
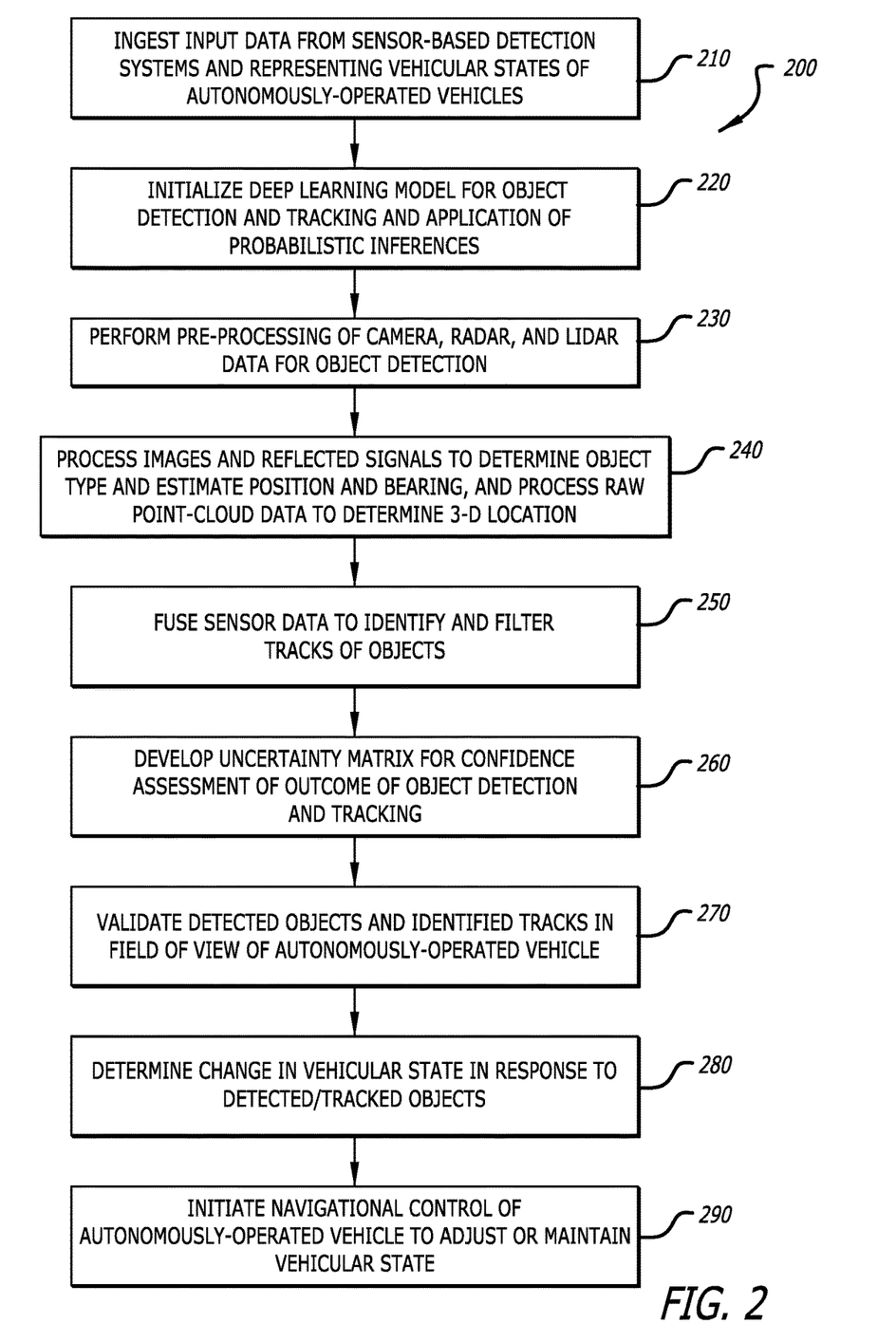
FIG. 2 is a flowchart illustrating steps in a process of performing the framework for detecting and tracking objects for autonomous operation of vehicles such as agricultural equipment, according to another embodiment of the present disclosure.

FIG. 2 is a flowchart illustrating a process 200 for performing the object detection and tracking framework 100 of an embodiment of the present disclosure. The process 200 begins at step 210 by initializing multiple sensor systems on, or associated with, autonomously-operated vehicles 102, and ingesting input data 110 from those sensor systems, as well as from on-board systems providing information as the a vehicular state 121 and 122 for the autonomously-operated vehicles 102, for example where agricultural applications in performing field activities 108 are commenced using driverless vehicles and equipment. The sensor systems at step 210 are activated and begin the process of continually observing defined fields of view 103, and input data 110 is collected from the camera 111, radar 114, and LiDar 116 as the autonomously-operated machinery 102 operates in a selected environment. At step 220, the process 200 initializes a deep learning model 140 for detection and tracking functions, and for applying techniques to develop and infer one or more probabilistic inferences to confirm a validity of detected objects 104 and predicted tracks 105.

At step 230, the process 200 performs a pre-processing of input data 110 ingested from the camera 111, radar 114, and LiDar 116 sensors to prepare the raw information in that input data 110 for subsequent processing in sub-system components of the deep learning model 140 as described in detail above. This includes, at step 240, the processing of images from the camera 112 and the reflected signals from the radar 114 to determine an object type and estimate its position and bearing, and also includes processing point-cloud data from the LiDar 116 to determine its 3D location in a field of view 103.

At step 250, the process 200 uses the pre-processed outputs of the plurality of sensors to fuse 153 sensor the input data 110 relative to the fields of view 103 to initiate other sub-processes of multi-object tracking 154 and filtering 155 to create, match, predict and filter tracks 105 as described above. At step 260, the process then outputs detected objects 104 and object tracks 105 to a confidence assessment module 146 that is configured, as noted above, to perform a look-back at particular attributes of the object 104 and its track 105 to determine a validity and accuracy of those outputs. In step 260, the process 200 develops an uncertainty matrix 156, converts the uncertainty matrix 156 into a total probability value, and assesses those particular attributes of the object 104 and its track 105 using the total probability value in conjunction with an application of techniques such as Bayesian inferences 157, a Gaussian model 158, and a state estimator (e.g., Kalman filter) 159. These techniques generate, at step 270, a validation 160 of the detected objects 104 and their associated tracks 105 in the fields of view 103 of sensors associated with the autonomously-operated vehicle 102. At least steps 230, 240, 250 and 260 represent an application of one or more artificial intelligence techniques in the deep learning model 140 to improve detection of objects 104 and development of their associated tracks 105 using the cameras 112, radar 114, and LiDar 116 (and other) detection systems.

At step 280, the process 200 applies the validated outputs representing detected objects 104 and their associated tracks 105 to assess an operational mode of the autonomously-operated vehicle 102 and determine whether a change in vehicular state is needed in response thereto. This may include, as noted above, determining whether to maintain or adjust characteristics such as position, direction and heading, and movement of the autonomously-operated vehicle 102. At step 290, the process outputs instructions to initiate navigational control 172 of the autonomously-operated vehicle 102 to adjust or maintain 174 the vehicular state, either directly to the autonomously-operated vehicle 102 itself or via a machinery controller 164. Steps 270, 280 and 290 of the process 200 therefore represent a generation of output data 170 of the framework 100 in some form that may be used to respond to detection of objects 104 and their associated tracks 105.

Figure 3:
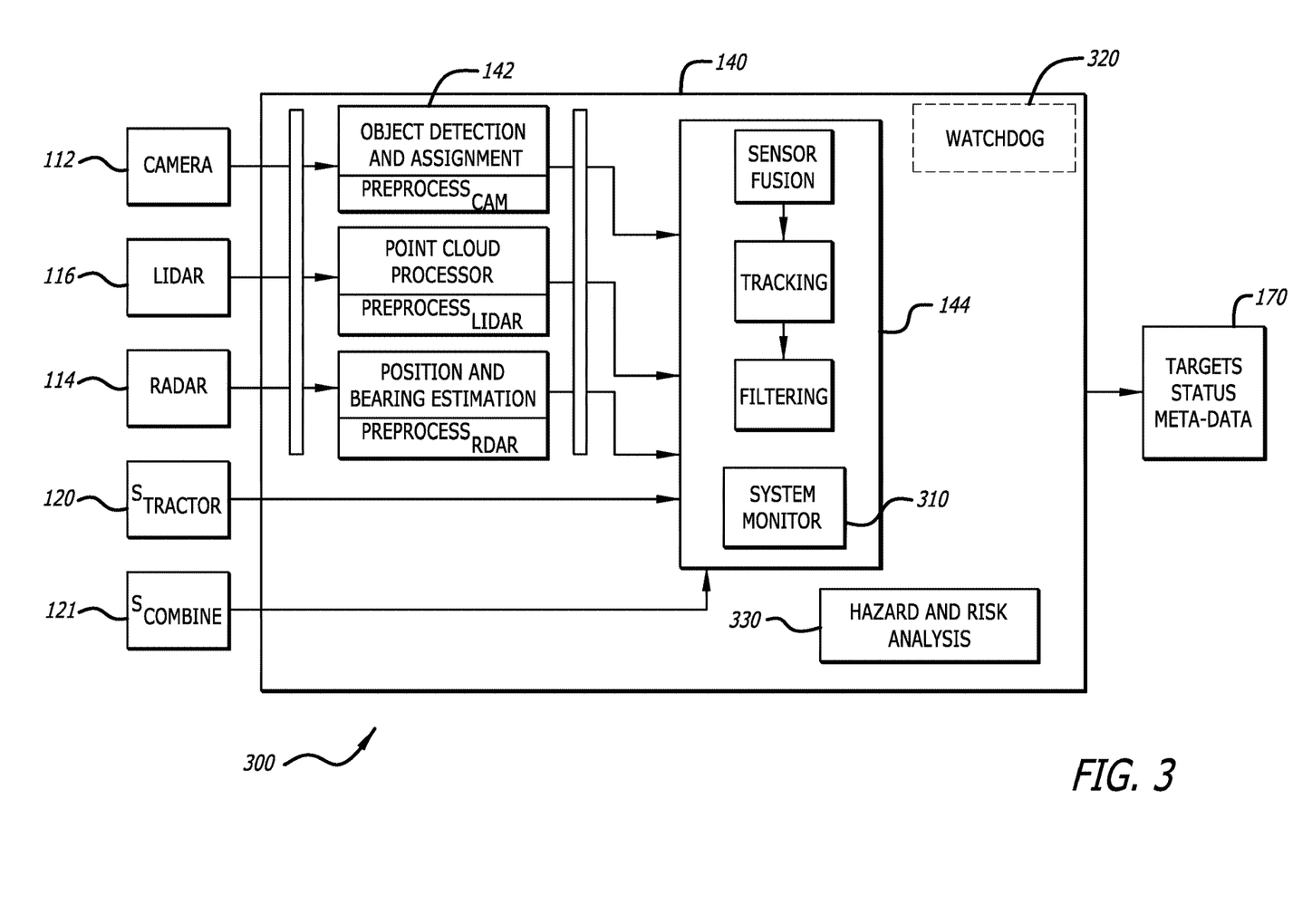
FIG. 3 is a block architecture diagram illustrating components of object detection and tracking subsystems of a deep learning model according to one embodiment of the present disclosure.

FIG. 3 is a further block diagram illustrating components of a cyber-physical architecture for detection and tracking subsystems of the framework 100 of an embodiment of the present disclosure. FIG. 3 shows input data 110, collected from sensors such as camera 112, radar 114, and LiDar 116, and vehicular state information for vehicles such as a tractor 121 and a combine 122, applied to the deep learning model 140 for generating output data 170.

In addition to the module 142 comprising the sub-systems for object detection and pre-processing, the module 144 comprising the sub-systems for object tracking, and module 146 comprising the sub-systems for performing a confidence assessment (not shown in FIG. 3), the deep learning model 140 and the framework 100 may also include a system monitor 310, a "watchdog" module 320, and a hazard and risk analysis engine 330. Each of these additional components are described below, and each of these are associated with ensuring that the framework 100 is performing properly and in a safe manner for operation of autonomously-operated vehicle 102.

The system monitor 310 is configured to monitor the incoming sensor data, and statuses from all the sensors connected to the framework 100. If any of the sensors sends a fail status, or if there are no messages from any of those sensors, this subsystem 310 triggers a fail status. This may include an instruction as output data 170 to stop system performance, an effect a navigational command 172 to stop operation of an autonomously-operated vehicle 102. The "watchdog" component 320 performs at a higher systemic level, and monitors the heartbeat of the object detection and tracking framework 100. If any of the sub-systems crashes, stalls or fails to send data to other connected sub-systems, the "watchdog" triggers a fail state to stop the framework 100 from any further operation.

The hazard and risk analysis engine 330 operates at still a higher level, and is responsible for maintaining and adjusting failure modes, for example how and when an input sensor will be considered to be in a failure state. A camera 112 may fail in two different cases. In one such case, the camera-based detection system sends a flag indicating the camera 112 is in a known failure state. The second failure state is when the camera 112 does not report any messages over a particular time period, for example for two seconds. In both cases the framework 100 sets a camera failure flag and externally reports this failure flag as output data 170.

The radar 114 may also fail in two different cases. In the first case, is the radar-based detection system sends us a flag indicating the radar 114 is in a known failure state. The second failure state is when the radar 114 does not report any messages over a specified time period, such as a two-second time period. In both cases the framework 100 sets a radar failure flag and will externally report this flag and externally reports this failure flag as output data 170.

The LiDar 116 may also fail in two different cases. In the first case, the LiDar-based detection system sends a flag indicating the LIDAR 116 is in a known failure state. The second failure state is when the LIDAR 116 does not report any messages, again for example over a two-second period. In both cases the framework 100 sets a LiDar failure flag and externally reports this failure flag as output data 170.

Embodiments of the present disclosure may also include a support tool that is configured to allow access for configuration of the plurality of sensors, fields of view 103, and navigational decision-making in response to detected objects 104 and their associated tracks 105 in the safety framework 100. The support tool may also enable a user to input and/or select variables relative to operational characteristics and the vehicular states 121 and 122, for conducting operations with the autonomously-operated vehicle 102 that are related to ensuring its safe and accurate job performance in response to detected objects 104 and their associated tracks 105. For example, operational field boundaries can be input or selected, as well as attributes (such as GPS coordinates and, boundaries, and sizes) of field conditions, and adjustments to known operational characteristics in the vehicular states 121 and 122, that are already known to the user.

The support tool may further include a function enabling a user override that overrides automatic navigational control of the autonomously-operated vehicle 102. Such a user override allows a user to instruct the framework 100 to ignore a detected object 104 and its track 105, and proceed with performance of the activity it is performing. The support tool may further be configured to generate recommendations, maps, or reports as output data 170, such as for example a report describing navigational actions taken in response to detected objects 104, types of detected objects 104, and locations within a particular field 106 of interest.

The support tool may be configured for visual representation to users, for example on a graphical user interface, and users may be able to configure settings for, and view various aspects of, object detection and tracking framework 100 using a display on such graphical user interfaces, and/or via web-based or application-based modules. Tools and pull-down menus on such a display (or in web-based or application-based modules) may also be provided to customize the sensors providing the input data 110, as well as to modify the fields of view 103. In addition to desktop, laptop, and mainframe computing systems, users may access the support tool using applications resident on mobile telephony, tablet, or wearable computing devices.

It is to be understood that the object detection and tracking framework 100 may be performed remote from the autonomously-operated vehicle 102, either wholly or in part, or on-board the autonomously-operated vehicle 102, again either wholly or in part. In the latter case, the autonomously-operated vehicle 102 may include one or more on-board controllers and other hardware and software configured to allow the autonomously-operated vehicle 102 to communicate information for carrying out the various detection and tracking functions described herein.

The systems and methods of the present disclosure may be implemented in many different computing environments. For example, the object detection and tracking framework 100 may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present disclosure. Exemplary hardware that can be used implementing embodiments of the present disclosure includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present disclosure may also be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the present disclosure have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method for tracking objects for an autonomously-operated agricultural vehicle, the method comprising:
receiving a first vehicular state information for the autonomously-operated agricultural vehicle performing an agricultural application;
receiving a second vehicular state information for the autonomously-operated agricultural vehicle performing the agricultural application;
receiving a first set of sensor data from a first sensor, wherein the first sensor includes a camera, and the first set of sensor data includes an image frame from the camera;
receiving a second set of sensor data from a second sensor;
detecting one or more objects based on the first set of sensor data;
identifying each of one or more objects as an object type;
fusing the second set of sensor data with the first set of sensor data to generate fused data based on the object type for each object, including:
identifying a two-dimensional location for respective objects in the image frame;
generating an angle and a first distance of each respective object relative to a center of the image frame and a focal length of the camera based on the two-dimensional location;
identifying respective objects in a field of view of the second sensor data;
generating an angular orientation, a velocity, and a second distance of each respective object relative to a center of the field of view of the second sensor data; and
correlating respective objects in the image frame and respective objects in the field of view of the second sensor data to identify detected objects having a matching orientation;
generating a track for each detected object based on the fused data;
generating a list of active tracks;
generating a predictive model to predict each object's track based on the fused data;
receiving a new set of data from the first sensor or the second sensor;
comparing the new set of data to the list of active tracks;
determining an unmatched track from the list of active tracks based on the comparing the new set of data to the list of active tracks;
initiating a decaying period based on determining an unmatched track;
during the decaying period, generating the predictive model for the respective detected object corresponding to the unmatched track but track information for the respective detected object corresponding to the unmatched track is not updated;
in an event a new measurement is received during the decaying period corresponding to the unmatched track, updating the track information for the for the respective detected object corresponding to the unmatched track and maintaining the unmatched track to the list of active tracks;
in an event no new measurement is received during the decaying period corresponding to the unmatched track, removing the unmatched track from the list of active tracks after the decaying period;
adjusting the first vehicular state and the second vehicular state for performing the agricultural application based on the track and predictive model for each object; and
generating a navigation control for the autonomously-operated agricultural vehicle based on the track and predictive model for each object.

2. The method of claim 1, wherein the second sensor includes a first ranging system.

3. The method of claim 2, further comprising:
receiving a third set of sensor data from a third sensor, wherein the third sensor includes a second ranging system and third set of sensor data includes point-cloud data of the second ranging system; and
processing the point-cloud data representing respective objects detected by the second ranging system to generate[s] a three-dimensional bounding box for respective objects in the image frame.

4. The method of claim 1, further comprising:
filtering data points in the second set of sensor data to remove data points outside of a specified criteria for an operating condition of the autonomously-operated vehicle;
extracting data points representing a ground plane to differentiate the ground plane and the one or more objects;
clustering data points representing each object;
segmenting the data points into individual point clouds each representing an object of the one or more objects based on a sample consensus model; and
based on an outlier detection model, generating a best-fit model for each point cloud and its associated object.

5. The method of claim 1, wherein the second set of sensor data includes radar data.

6. The method of claim 1, wherein the second set of sensor data includes Lidar data.

7. The method of claim 1, further comprising:
performing a confidence assessment for each track based on probabilistic inferences of uncertainty associated with the first and second sets of sensor data.

8. The method of claim 7, further comprising:
generating an uncertainty matrix of errors from sensor measurements due to noise;
applying a Bayesian inference model to convert the uncertainty matrix into a total probability value for each object;
applying a Gaussian model to identify a specific bounding box for each object across the first and second sets of sensor data to identify attributes for each object; and
comparing the attributes of each object with the total probability value to generate the confidence assessment.

9. The method of claim 1, further comprising:
receiving a third set of sensor data from a third sensor; and
fusing the first, second, and third sets of sensor data to generate the fused data.

10. An autonomously-operated agricultural vehicle, comprising:
a first sensor configured to detect one or more objects and to generate first set of sensor data, wherein the first sensor includes a camera, and the first set of sensor data includes an image frame from the camera;
a second sensor configured to detect the one or more objects and generate a second set of sensor data, wherein the first and second sensors are different types of sensors; and
a controller in communication with the first and second sensors, the controller configured to:
receive a first vehicular state information for the autonomously-operated agricultural vehicle performing an agricultural application;

receive a second vehicular state information for the autonomously-operated agricultural vehicle performing the agricultural application;
identify each of the one or more objects as an object type;
fuse the second set of sensor data with the first set of sensor data to generate fused data based on the object type for each object, including:
identifying a two-dimensional location for respective objects in the image frame;
generating an angle and a first distance of each respective object relative to a center of the image frame and a focal length of the camera based on the two-dimensional location;
identifying respective objects in a field of view of the second sensor data;
generating an angular orientation, a velocity, and a second distance of each respective object relative to a center of the field of view of the second sensor data; and
correlating respective objects in the image frame and respective objects in the field of view of the second sensor data to identify detected objects having a matching orientation;
generate a track for each detected object based on the fused data;
generate a list of active tracks;
generate a predictive model to predict each object's track based on the fused data;
receive a new set of data from the first sensor or the second sensor;
compare the new set of data to the list of active tracks;
determine an unmatched track from the list of active tracks based on the comparing the new set of data to the list of active tracks;
initiate a decaying period based on determining an unmatched track;
during the decaying period, generate the predictive model for the respective detected object corresponding to the unmatched track but track information for the respective detected object corresponding to the unmatched track is not updated;
in an event a new measurement is received during the decaying period corresponding to the unmatched track, update the track information for the for the respective detected object corresponding to the unmatched track and maintaining the unmatched track to the list of active tracks;
in an event no new measurement is received during the decaying period corresponding to the unmatched track, remove the unmatched track from the list of active tracks after the decaying period;
adjust the first vehicular state and the second vehicular state for performing the agricultural application based on the track and predictive model for each object; and
generate a navigation control for the autonomously-operated agricultural vehicle based on the track and predictive model for each object.

11. The autonomously-operated vehicle of claim 10, wherein the second sensor includes a first ranging system.

12. The autonomously-operated vehicle of claim 11, wherein the controller is further configured to:
receiving a third set of sensor data from a third sensor, wherein the third sensor includes a second ranging system and third set of sensor data includes point-cloud data of the second ranging system; and
processing the point-cloud data representing respective objects detected by the second ranging system to generate a three-dimensional bounding box for respective objects in the image frame.

13. The autonomously-operated vehicle of claim 10, wherein the controller is further configured to:
filter data points in the second set of sensor data to remove data points outside of a specified criteria for an operating condition of the autonomously-operated vehicle;
extract data points representing a ground plane to differentiate the ground plane and the one or more objects;
cluster data points representing each object;
segment the data points into individual point clouds each representing an object of the one or more objects s based on a sample consensus model; and
based on an outlier detection model, generate a best-fit model for each point cloud and its associated object.

14. The autonomously-operated vehicle of claim 10, wherein the second sensor includes a radar detector and the second set of sensor data includes radar data.

15. The autonomously-operated vehicle of claim 10, wherein the second sensor includes a Lidar detector and the second set of sensor data includes Lidar data.

16. The autonomously-operated vehicle of claim 10, wherein the controller is further configured to
perform a confidence assessment for each track based on probabilistic inferences of uncertainty associated with the first and second sets of sensor data.

17. The autonomously-operated vehicle of claim 16, wherein the controller is further configured to:
generate an uncertainty matrix of errors from sensor measurements due to noise;
apply a Bayesian inference model to convert the uncertainty matrix into a total probability value for each object;
apply a Gaussian model to identify a specific bounding box for each object across the first and second sets of sensor data to identify attributes for each object; and
compare the attributes of each object with the total probability value to generate the confidence assessment.

18. The autonomously-operated vehicle of claim 10, further comprising:
a third sensor configured to detect of the one or more objects and generate a third set of sensor data, wherein the first, second, and third sensors are different types of sensors; and
wherein the controller is further configured to fuse the first, second, and third sets of sensor data to generate the fused data.

19. The autonomously-operated vehicle of claim 10, wherein the navigation control is configured to maneuver the autonomously-operated vehicle away from an object based on the track and predictive model for that object.

20. A system comprising:
one or more processors of a machine; and
a memory storing instructions that, when executed by the one or more processors, cause the machine to perform operations comprising:
receiving a first vehicular state information for an autonomously-operated agricultural vehicle performing an agricultural application;
receiving a second vehicular state information for the autonomously-operated agricultural vehicle performing the agricultural application;
receiving a first set of sensor data from a first sensor, wherein the first sensor includes a camera, and the first set of sensor data includes an image frame from the camera;

receiving a second set of sensor data from a second sensor;

detecting one or more objects based on the first set of sensor data;

identifying each of one or more objects as an object type;

fusing the second set of sensor data with the first set of sensor data to generate fused data based on the object type for each object, including:

identifying a two-dimensional location for respective objects in the image frame;

generating an angle and a first distance of each respective object relative to a center of the image frame and a focal length of the camera based on the two-dimensional location;

identifying respective objects in a field of view of the second sensor data;

generating an angular orientation, a velocity, and a second distance of each respective object relative to a center of the field of view of the second sensor data; and correlating respective objects in the image frame and respective objects in the field of view of the second sensor data to identify detected objects having a matching orientation;

generating a track for each detected object based on the fused data;

generating a list of active tracks;

generating a predictive model to predict each object's track based on the fused data;

receiving a new set of data from the first sensor or the second sensor;

comparing the new set of data to the list of active tracks;

determining an unmatched track from the list of active tracks based on the comparing the new set of data to the list of active tracks;

initiating a decaying period based on determining an unmatched track;

during the decaying period, generating the predictive model for the respective detected object corresponding to the unmatched track but track information for the respective detected object corresponding to the unmatched track is not updated;

in an event a new measurement is received during the decaying period corresponding to the unmatched track, updating the track information for the for the respective detected object corresponding to the unmatched track and maintaining the unmatched track to the list of active tracks;

in an event no new measurement is received during the decaying period corresponding to the unmatched track, removing the unmatched track from the list of active tracks after the decaying period;

adjusting the first vehicular state and the second vehicular state for performing the agricultural application based on the track and predictive model for each object; and generating a navigation control for the agricultural autonomously-operated vehicle based on the track and predictive model for each object.

21. The system of claim 20, wherein the second sensor includes a first ranging system.

22. The system of claim 21, the operations further comprising:

receiving a third set of sensor data from a third sensor, wherein the third sensor includes a second ranging system and third set of sensor data includes point-cloud data of the second ranging system; and processing the point-cloud data representing respective objects detected by the second ranging system to generate[s] a three-dimensional bounding box for respective objects in the image frame.

23. The system of claim 20, the operations further comprising:

filtering data points in the second set of sensor data to remove data points outside of a specified criteria for an operating condition of the autonomously-operated vehicle;

extracting data points representing a ground plane to differentiate the ground plane and the one or more objects;

clustering data points representing each object;

segmenting the data points into individual point clouds each representing an object of the one or more objects based on a sample consensus model; and based on an outlier detection model, generating a best-fit model for each point cloud and its associated object.

24. The system of claim 20, wherein the second set of sensor data includes radar data.

25. The system of claim 20, wherein the second set of sensor data includes Lidar data.

26. The system of claim 20, the operations further comprising:

performing a confidence assessment for each track based on probabilistic inferences of uncertainty associated with the first and second sets of sensor data.

27. The system of claim 20, the operations further comprising:

generating an uncertainty matrix of errors from sensor measurements due to noise;

applying a Bayesian inference model to convert the uncertainty matrix into a total probability value for each object;

applying a Gaussian model to identify a specific bounding box for each object across the first and second sets of sensor data to identify attributes for each object; and comparing the attributes of each object with the total probability value to generate the confidence assessment.

28. The system of claim 20, the operations further comprising:

receiving a third set of sensor data from a third type of sensor; and fusing the first, second, and third sets of sensor data to generate the fused data.

* * * * *

UNITED STATES PATENT AND TRADEMARK OFFICE
CERTIFICATE OF CORRECTION

PATENT NO. : 12,091,056 B2
APPLICATION NO. : 17/241734
DATED : September 17, 2024
INVENTOR(S) : Ramakrishnan et al.

It is certified that error appears in the above-identified patent and that said Letters Patent is hereby corrected as shown below:

On the Title Page

On page 2, in Column 2, under "Other Publications", Line 51, delete "Resonse" and insert --Response-- therefor In the Specification In Column 4, Line 16, delete "150" and insert --172-- therefor In Column 8, Line 52, delete "154" and insert --153-- therefor In Column 12, Line 17, delete "121" and insert --120-- therefor In Column 12, Line 17, delete "122," and insert --121,-- therefor In Column 12, Line 25, delete "121 or 122," and insert --120 or 121,-- therefor In Column 12, Line 28, delete "121 and 122," and insert --120 and 121,-- therefor In Column 14, Line 57, delete "121 and 122" and insert --120 and 121-- therefor In Column 14, Line 63, delete "111," and insert --112,-- therefor

In Column 15, Line 4, delete "111," and insert --112,-- therefor

In Column 15, Line 15, delete "fuse" and insert --fusion-- therefor

In Column 16, Line 17, delete "command" and insert --control-- therefor

In Column 16, Line 58, delete "121 and 122," and insert --120 and 121,-- therefor Signed and Sealed this
Second Day of September, 2025

Coke Morgan Stewart
*Acting Director of the United States Patent and Trademark Office*

CERTIFICATE OF CORRECTION (continued)
U.S. Pat. No. 12,091,056 B2

In Column 16, Line 66, delete "121 and 122," and insert --120 and 121,-- therefor In the Claims In Column 19, Line 57, in Claim 1, delete "for the for the" and insert --for the-- therefor In Column 21, Line 44, in Claim 10, delete "for the for the" and insert --for the-- therefor In Column 22, Line 12, in Claim 13, after "objects", delete "s"

In Column 22, Line 23, in Claim 16, after "to", insert --:--